April 25, 1939. W. F. GROENE 2,155,707
COMPOUND REST FOR LATHES
Filed June 27, 1938
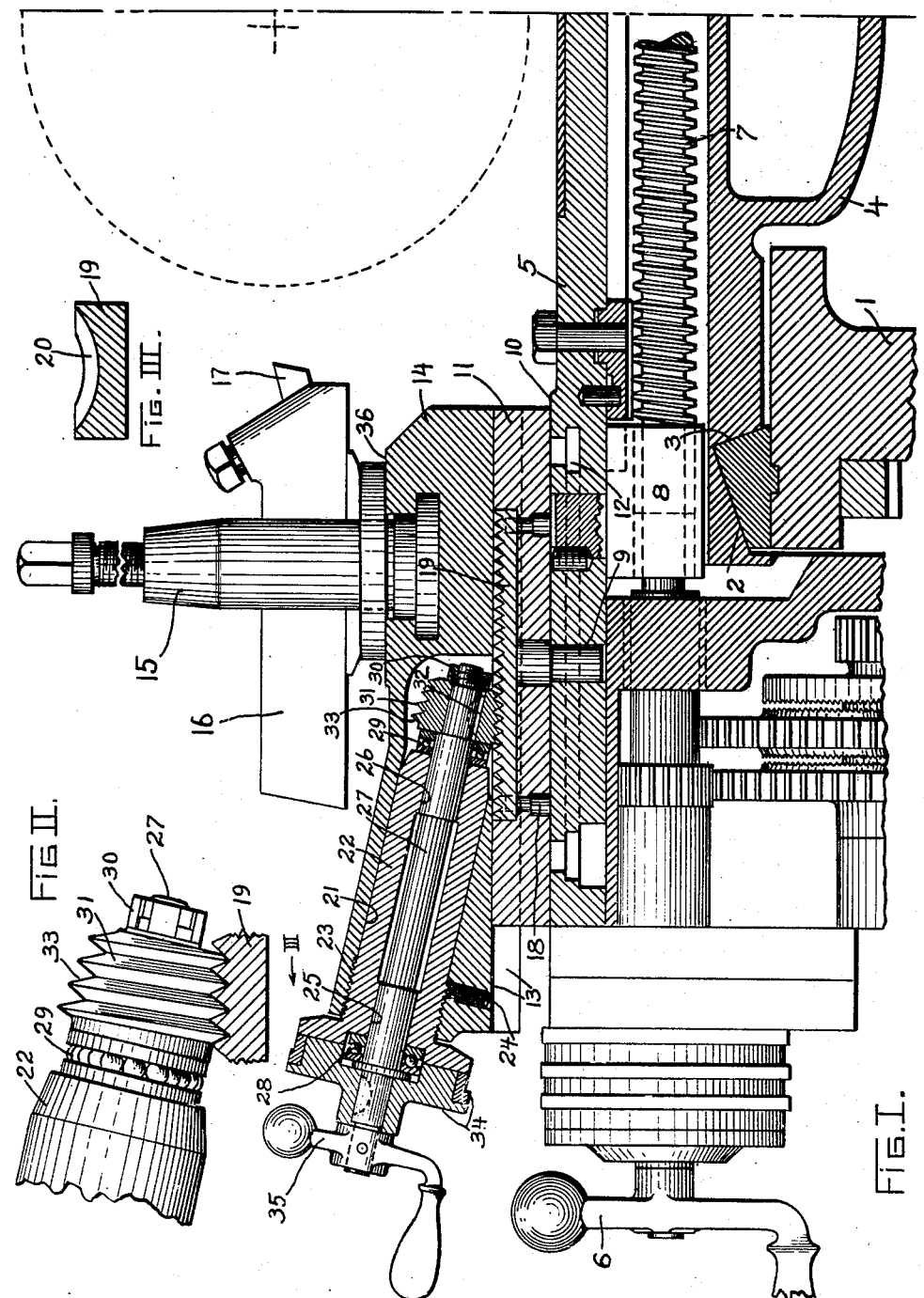
WITNESS.
Elmer R. Shipley.
INVENTOR.
WILLIAM F. GROENE
BY Willard S. Groene
ATTORNEY.

Patented Apr. 25, 1939

2,155,707

UNITED STATES PATENT OFFICE 2,155,707

COMPOUND REST FOR LATHES

William F. Groene, Cincinnati, Ohio, assignor to The R. K. Le Blond Machine Tool Company, Cincinnati, Ohio, a corporation of Delaware Application June 27, 1938, Serial No. 216,017

6 Claims. (Cl. 82—24)

This invention pertains to compound rest for lathe and is particularly related to the actuating mechanism for such rests for moving the cutting tool to or from a work piece in the lathe. This invention is particularly adapted to lathes of the engine lathe type. It has always been difficult in lathes of this type to provide a compound rest on the lathe carriage or cross slide which is compact in design to permit rigid support of the cutting tool, without encountering difficulty of interference between the ball crank handle on the cross feed screw and the compound rest actuating ball crank handle. This difficulty has been avoided in the past by the use of bevel gearing connecting the actuating shaft to the compound rest screw, but such an arrangement is found defective because of the back lash in the gearing which makes accurate reading of the compound rest dial inaccurate and prevents accurate positive setting of the compound rest on the cross slide.

An object of this invention is to provide means in a lathe for offsetting the actuating handle and shaft of a compound rest relative to its path of travel while at the same time eliminating all back lash in the actuating mechanism.

Another object of this invention is to provide in a compound rest for lathe, an offset actuating shaft, a conical worm on said shaft, and a cooperating rack for effecting movement of said compound rest.

Still another object of this invention is to provide a rack and conical worm actuating means for a compound rest for lathe and means for adjusting said rack and worm relative to one another to eliminate all back lash between said members.

Further objects and advantages of this invention will appear from a detailed description of the drawing in which:

Figure I is a fragmentary section through a typical engine lathe particularly showing the cross slide and compound rest assembly.

Figure II is an enlarged view of a portion of Figure I particularly showing the outward appearance of the conical worm.

Figure III is a section through the rack showing its concave teeth.

This invention is shown applied to a typical engine lathe having a bed 1 with ways 2 and 3 upon which slides the carriage 4. On the carriage 4 is slidably mounted the cross slide 5 which is manually actuated by the ball crank handle 6 mounted on the cross feed screw 7 which operates in the cross feed nut 8 fixed to the cross slide 5 in a manner similar to that shown in Figure 7 of Patent 2,097,375 dated October 26, 1937.

Mounted to swivel about the pin 9 and the surface 10 of the cross slide 5 is the compound rest bottom 11 which may be clamped at various positions of swinging by suitable T-slot bolts (not shown) operating in the annular T slot 12 as is usual for lathes. Slidably mounted on appropriate dovetail guideways 13 on the compound rest bottom 11 is the compound rest 14 carrying the usual tool post 15, tool holder 16, and cutting tool 17.

Fixed to the compound rest bottom 11 by suitable screws 18 is the rack 19 having concave rack teeth 20, Figure III. In a bore 21 angularly related to the guideways 13 is nicely fitted a bushing 22 which is threaded at 23 in the bore 21 for accurate axial setting of the bushing, a set screw 24 serving to lock it in adjusted position. Journaled in suitable bearings 25 and 26 in the bushing 22 is the compound rest actuating shaft 27 which is confined against all axial movement in the bushing by suitable ball thrust bearings 28 and 29 by properly adjusting the lock nut 30 which also securely holds the conical worm 31 on the shaft 27 in conjunction with the key 32. The teeth 33 of the conical worm are specially designed to nicely mesh with the concave teeth 20 to form a lash free mechanism when properly adjusted by setting the bushing 22 as described. Mounted on the outer upwardly extended end of the shaft 27 is the usual dial indicating mechanism 34 and the ball crank operating handle 35. It is obvious that by so upwardly positioning the shaft 27 interference between the ball crank handles 6 and 35 is eliminated while at the same time permitting a low surface 36 on the compound rest 14 for the tool post. By using the conical worm and rack construction this arrangement is made possible while at the same time eliminating the objectionable back lash of constructions heretofore used.

Having thus fully set forth and described my invention, what I claim and desire to secure by United States Letters Patent is:

1. In a lathe, a bed, a carriage mounted on said bed, a cross slide mounted on said carriage, a compound rest movably mounted on said cross slide, means for actuating said compound rest comprising a conical worm, a concave rack mechanism, and manual means for rendering said mechanism operative.

2. In a lathe, a bed, a carriage mounted on said bed, a cross slide mounted on said carriage, a compound rest movably mounted on said cross slide, means for actuating said compound rest comprising a rack fixed on said cross slide, a shaft angularly related to said rack, a worm on said shaft operatively engaging said rack, and means for rotating said shaft to effect movement of said compound rest.

3. In a lathe, a bed, a carriage mounted on said bed, a cross slide mounted on said carriage, a compound rest movably mounted on said cross slide, means for actuating said compound rest comprising a concave rack fixed on said cross slide, a shaft angularly related to said rack, a conical worm on said shaft operatively engaging said rack, and means for rotating said shaft to effect movement of said compound rest.

4. In a lathe, a bed, a carriage mounted on said bed, a cross slide mounted on said carriage, a cross feed screw, a ball crank handle for rotating said screw to actuate said cross slide, a swivel slide mounted on said cross slide, a compound rest slidably mounted on said swivel slide, means for moving said compound rest comprising, a shaft rotatably mounted in said compound rest, a rack fixed on said swivel slide, a conical worm fixed on said shaft and operatively engaging said rack, and a ball crank handle fixed on said shaft whereby said compound rest may be actuated at any position of swiveling of said compound rest.

5. In a lathe, a bed, a carriage mounted on said bed, a cross slide mounted on said carriage, a cross feed screw, a ball crank handle for rotating said screw to actuate said cross slide, a swivel slide mounted on said cross slide, a compound rest slidably mounted on said swivel slide, means for moving said compound rest comprising, a shaft rotatably mounted in said compound rest, a rack fixed on said swivel slide, a conical worm fixed on said shaft and operatively engaging said rack, means for bodily adjusting said shaft and worm relative to said rack to eliminate all back lash between said worm and rack, and a ball crank handle fixed on said shaft whereby said compound rest may be actuated.

6. In a lathe, a bed, a carriage mounted on said bed, a cross slide mounted on said carriage, a cross feed screw, a ball crank handle for rotating said screw to actuate said cross slide, a swivel slide mounted on said cross slide, a compound rest slidably mounted on said swivel slide, means for moving said compound rest comprising, a shaft rotatably mounted in said compound rest, a rack fixed on said swivel slide, a conical worm fixed on said shaft and operatively engaging said rack, means for bodily adjusting said shaft and worm axially relative to said rack and in a direction angularly related thereto to eliminate all back lash between said worm and rack, and a ball crank handle fixed on said shaft whereby said compound rest may be actuated.

WILLIAM F. GROENE.